(12) United States Patent
Maganas (10) Patent No.: US 7,509,798 B2
(45) Date of Patent: Mar. 31, 2009

(54) METHODS AND SYSTEMS FOR SAFELY OPERATING A DIESEL ENGINE IN A METHANE-RICH ENVIRONMENT

(76) Inventor: Thomas C. Maganas, 1200 Ardmore, Manhattan Beach, CA (US) 90266

( * ) Notice: Subject to any disclaimer, the term of this patent is extended or adjusted under 35 U.S.C. 154(b) by 946 days.

(21) Appl. No.: 10/974,094

(22) Filed: Oct. 27, 2004

(65) Prior Publication Data
US 2006/0248875 A1 Nov. 9, 2006

(51) Int. Cl.
*F02M 25/06* (2006.01)
(52) U.S. Cl. .............................. 60/279; 60/274; 60/278; 123/568.11; 123/568.15
(58) Field of Classification Search ................... 60/274, 60/278, 279, 299; 123/568.11, 568.15
See application file for complete search history.

(56) References Cited

U.S. PATENT DOCUMENTS

| | | | |
|---|---|---|---|
| 2,956,865 A | 10/1960 | Williams | |
| 3,632,304 A | 1/1972 | Hardison | |
| 3,714,071 A | 1/1973 | Michalko | |
| 3,841,242 A | 10/1974 | Sigg | |
| 3,846,980 A | * 11/1974 | DePalma | 60/279 |
| 3,915,890 A | 10/1975 | Soldate | |
| 3,922,975 A | 12/1975 | Reese | |
| 4,052,173 A | 10/1977 | Schulz | |
| 4,308,806 A | 1/1982 | Uemura et al. | |
| 4,330,513 A | 5/1982 | Hunter et al. | |
| 4,497,637 A | 2/1985 | Purdy et al. | |
| 4,623,400 A | 11/1986 | Japka et al. | |
| 4,701,312 A | 10/1987 | Kice | |
| 4,708,067 A | 11/1987 | Narisoko et al. | |
| 4,724,776 A | 2/1988 | Foresto | |
| 4,761,270 A | 8/1988 | Turchan | |
| 4,886,001 A | 12/1989 | Chang et al. | |

(Continued)

FOREIGN PATENT DOCUMENTS

EP 0176123 A1 4/1986

(Continued)

OTHER PUBLICATIONS

Raman probe validates oxidation model in supercritical water; Combustion Research Facility News; Sep./Oct. 1995; vol. 17, No. 5.

(Continued)

*Primary Examiner*—Tu M Nguyen
(74) *Attorney, Agent, or Firm*—Workman Nydegger (57) ABSTRACT

A method and system for more safely operating a diesel engine in a methane-rich environment, such as a mine. The method includes providing a diesel engine having an air intake, a combustion chamber, and an exhaust. Methane-rich air is introduced into the engine through the air intake and mixed with diesel fuel, which is combusted. The exhaust gases are introduced into a converter comprising a bed of silica. The converter generates highly reactive hydroxyl radicals that are attracted to the combustion temperature at the cylinders. The hydroxyl radicals form supercritical water in the cylinders, and eliminate soot formation, increases engine efficiency, and reduce top combustion temperature. The disclosed methods and systems significantly reduce pollutants and the risk of explosions within or near the diesel engine. The methods and systems also result in single phase emissions, whether or not operated in a methane-rich environment.

23 Claims, 2 Drawing Sheets

U.S. PATENT DOCUMENTS

| | | | |
|---|---|---|---|
| 4,974,531 A | | 12/1990 | Korenberg |
| 4,977,840 A | | 12/1990 | Summers |
| 4,991,521 A | | 2/1991 | Green et al. |
| 5,010,830 A | | 4/1991 | Asuka et al. |
| 5,178,101 A | | 1/1993 | Bell |
| 5,181,795 A | | 1/1993 | Circeo, Jr. et al. |
| 5,207,734 A | | 5/1993 | Day et al. |
| 5,335,609 A | | 8/1994 | Nelson et al. |
| 5,347,936 A | | 9/1994 | Thorhuus |
| 5,676,070 A | | 10/1997 | Maganas et al. |
| 5,785,030 A | * | 7/1998 | Paas .................. 60/278 |
| 5,806,308 A | * | 9/1998 | Khair et al. ............ 60/278 |
| 5,928,618 A | | 7/1999 | Maganas et al. |
| 6,152,118 A | * | 11/2000 | Sasaki et al. ........ 123/568.21 |
| 6,427,436 B1 | * | 8/2002 | Allansson et al. ......... 60/274 |
| 6,742,335 B2 | * | 6/2004 | Beck et al. ............ 60/605.2 |

FOREIGN PATENT DOCUMENTS

| | | |
|---|---|---|
| EP | 0605719 A1 | 7/1994 |
| FR | 2687765 A1 | 2/1992 |
| FR | 2701223 A1 | 8/1994 |
| GB | 541962 | 12/1941 |
| JP | 55-24597 | 7/1979 |
| JP | 358095192 A | 6/1983 |
| JP | 5-115752 | 2/1992 |
| WO | WO 93/24207 | 12/1993 |

OTHER PUBLICATIONS

Measuring Atmospheric Concentrations of the Hydroxyl Radical; The Hydroxyl Radical; Sources and Measurement; http://www.chem.leeds.ac.uk/Atmospheric/Field/oh.html.

Supercritical Water Oxidation; Text provided by Philip A. Marrone; http://web.mit.edu/muchomas/www/Xolas/scwo.html.

Wang, Linda; Paving Out Pollution, A Common Whitener Helps to Clean the Air; Scientific American; Feb. 2002.

Guedes De Carvalho et al.; Mass Transfer Around Carbon Particles Burning in Fluidised Beds; Trans IChemE, vol. 69, Part A, Jan. 1991, pp. 63-70.

Biozone Scientific, Hydroxyls: Powerful Air Purification; www.extrapureair.com; Jun. 19, 2002.

* cited by examiner

METHODS AND SYSTEMS FOR SAFELY OPERATING A DIESEL ENGINE IN A METHANE-RICH ENVIRONMENT

BACKGROUND OF THE INVENTION

1. The Field of the Invention

The present invention relates to the catalytic elimination of organic waste and pollutants found in the exhaust of diesel engines. More particularly, the present invention relates to methods and systems for safely operating a diesel engine within a methane-rich environment, such as a mine.

2. The Relevant Technology

Internal combustion engines are known to emit pollutants that are toxic to humans. Extensive exposure to pollutants can cause health related problems in humans and are a significant source of air pollution in developing and developed countries, such as the United States. Diesel engines are particularly common source of pollution. The black smoke, or soot, is the most visible emission, but other, less visible pollutants are also present. The emissions from a diesel engine are composed of three phases: solids, liquids, and gases. The combined solids and liquids are called particulates, or total particulate matter ("TPM"), and are composed of dry carbon (soot), inorganic oxides (primarily as sulfates), and liquids.

When diesel fuel is burned, a portion of the sulfur is oxidized to sulphate which, upon reaction with the moisture in the exhaust, becomes $H_2SO_4$. The liquids are a combination of unburned diesel fuel and lubricating oil called the soluble organic fractions (SOF) or volatile organic fractions (VOF) which form discrete aerosols and/or are adsorbed within the dry carbon particles. Gaseous hydrocarbons, carbon monoxide, nitrogen oxides, and sulfur dioxide are the constituents of a third phase. The emissions from burned diesel fuel can also vary on the amount of lubricant in the diesel fuel. Other engines may generate a dry exhaust in which the SOF is lower, with the balance being primarily dry carbon. Diesel emission are clearly more complex than those of gasoline engines and, hence, their catalytic treatment is more complicated and requires new technology.

In response to pollution caused by gasoline-powered internal combustion engines, catalytic converters have been developed to reduce the levels of pollutants that are emitted into the environment from burning gasoline. Catalytic converters are typically positioned in-line with the exhaust system of the gas engine and are generally able to catalytically convert most of the unburned hydrocarbons into $CO_2$ and water.

Conventional catalytic converters contain palladium or platinum, which are coated on top of carrier beads or pellets made of inert and heat-resistant materials in order to increase the surface area of the active catalyst and keep the particles from escaping through the exhaust pipe. Coating the catalytic metal on a substrate also decreases the cost of the catalyst particles since most catalytic metals are much more expensive than a substrate. Because lead-based additives can "poison" or destroy the usefulness of the catalyst, such additives have been banned.

Although modern catalytic converters can be used to convert unburned hydrocarbons to carbon dioxide ($CO_2$) and water, they are generally only feasible for use in gasoline-powered vehicles. Existing catalytic converters are less suitable for use with diesel engines. The type of fuel and the manner in which it is burned in a diesel engine produce substantial quantities of soot and other unburned hydrocarbons, which are too plentiful to be efficiently converted into $CO_2$ and water using existing catalytic converters. Although diesel engines are known to significantly pollute, diesel engines have been largely exempted from the stringent air quality guidelines for economic reasons. One reason is that diesel engines are used for long-haul shipping, such as such as by tractor-trailers and trains. Their elimination might cause dire economic problems.

In the coal mining industry, however, the use of diesel engines is heavily regulated. Because of the natural gas present in mines and the pollutants created by diesel engines, enclosed areas such as mines create a particularly sensitive environment for operating diesel engines. As a result, the U.S. Department of Labor Mine Safety and Health Administration (MSHA) has promulgated federal regulations governing the use of diesel engines in underground mines. Federal regulations found in 30 C.F.R. Parts 7, 36, 70, and 75 provide safety standards for underground coal mines. The Regulations stipulate various conditions including the fuel-air mixture ratios, operating temperatures, and levels of pollutants in the exhaust. MSHA also requires special equipment such as flame arrestors on the intake and exhaust.

MSHA has disseminated stringent rules regarding the emission of various pollutants. For instance, recent MSHA standards require that diluted exhaust gases from diesel engines contain no more than 0.5% by volume of carbon dioxide; 0.01% by volume of carbon monoxide; 0.0025% by volume of oxides of nitrogen (calculated as equivalent nitrogen dioxide); or 0.0010 percent, by volume, of aldehydes (calculated as equivalent formaldehyde) under any condition of engine operation prescribed by MSHA. Proper testing of a diesel engine also requires measuring the levels of methane in the exhaust gas. Unlike normal operating conditions, operating a diesel engine in a methane-rich environment increases the chances that the exhaust will contain methane.

Preventing explosions and reducing pollution in underground mines is another challenge when operating a diesel engine. The coal found in mines can produce high levels of methane. The methane becomes trapped in the enclosed mine, thus creating a hazard for humans and machines. For example, mines have been known to contain air that is 8% by volume methane, and in some cases, the concentrations can reach 12% by volume of methane. Once released by the coal, the methane typically remains in the mine because of poor ventilation.

Because methane is combustible, diesel engines operating in or around mines can cause pockets of methane to explode. In addition, diesel engines use the surrounding air for air intake to complete combustion of the diesel fuel. Methane in the surrounding air is sucked into the diesel engine where it can explode. Because methane is more explosive than diesel fuel, the methane presents a risk if found in high concentrations.

Methane creates a particular risk of explosion due to incomplete seating of valves and fuel blow-by caused thereby. All diesel engines have three phases of emissions. In the first phase, incomplete pre-ignition causes soot to be jammed in the valve seats, which prevents complete seating of the valves. This allows pressurized air-fuel mixture to pass through the valve during each stroke, resulting in the blow-by of approximately 20% fuel and lubricating oil. In addition, soot that is formed due to incomplete mixing of the fuel-air mixture produces cold spots in the piston and wall crevices. Parts of the soot become fused to the valve seat, becoming elemental carbon, and turned white-hot due to friction. Elemental carbon is formed during the second and third phases of the emission cycle. When a diesel engine operating under normal conditions is utilized in a mine high in methane gas, the methane gas, in addition to the fuel-air mixture, forms part of the blow-by that escapes through the unseated valve.

Miliseconds after the top of compression, the methane can interact with the white-hot elemental carbon fused to the valve seat, at such high temperatures, can yield a great explosion. Sparks comprising red hot carbon from the valves can literally fly out of the emissions, potentially causing fires or explosions outside of the diesel engine. For this reason spark arrestors are commonly used.

Mines create a particularly problematic environment for operating a diesel engine because the engine's air intake draws in methane from the surrounding air. Unmixed, the increase in fuel-air ratios increases the emission of toxic gases such as carbon monoxide and nitrogen dioxide. Further compounding the problem is the fact that coal mines are often enclosed and poorly ventilated.

While techniques exist for properly operating a diesel engine in or near a mine, these techniques are often costly and undesirable. For example, the engine must be operated at lower than full power and/or be modified to include expensive and complicated equipment.

Therefore, what is needed is a cost effective system that can prevent explosions in or near diesel engines running in a methane-rich environment and that can reduce the amounts of non-combusted fuels and pollutants in the exhaust gases.

BRIEF SUMMARY OF THE INVENTION

The present invention relates to new methods and systems for operating 2-cycle and 4-cycle diesel engines in a methane-rich environment such as a mine. The methods and systems of the present invention provide for the complete combustion of methane, soot and other unburned organic materials otherwise found in the exhaust of diesel engines operating in a methane-rich environment (e.g., at least 1% methane, up to 12% or more methane). The methods and systems of the present invention can be used with coal mining machinery such as man transporters, roof bolters, mobile roof supports, degasification drills, loaders, dump trucks, and the like. In another aspect of the invention, a diesel engine is provided having single phase emissions whether or not operated in a methane rich environment.

The methods and systems employ a diesel engine within a methane-rich environment and a highly reactive combustion atmosphere containing hydroxyl radicals, oxidizing ions, producing supercritical water that has been found to be amazingly effective at eliminating most, if not all, carbon particulates, soot, hydrocarbons (including methane gas found in mines), formaldehyde, acetaldehyde, sulfur (up to 99.999%), CO, oily substances, other unburnt organic materials, and other pollutants that would otherwise be produced during combustion of carbon-containing fuels.

For reasons not entirely understood, it appears that the reactive combustion atmosphere acts to process or eliminate incomplete combustion products at or near the source of combustion (i.e., within the cylinders of the diesel engine). This is a new scientific discovery that supersedes many previously understood assumptions about combustion. The highly reactive atmosphere, which initially comprises hydroxyl radicals generated by interacting diesel exhaust with a catalytic bed of silica, hydroxylbastnasite and/or alumina particles, travel countercurrent up the exhaust conduit to the cylinders of the engine where supercritical water is formed. The highly reactive atmosphere has been shown to eliminate up to 99.999% of the hydrocarbons and sulfur that would otherwise be expelled in the exhaust stream, including virtually all soot, formaldehyde and acetaldehyde, which are common components of diesel exhaust. It is postulated that the hydroxyl radicals, when superheated and compressed within the cylinders, generate supercritical water in a gas plasma form that is at least partially responsible for increasing the combustion efficiency of the diesel engine during the first combustion phase, thereby eliminating most, if not all, of the soot that would otherwise be formed during the first phase. The elimination of soot ensures complete seating of valves and elimination of fuel-air "blow-by", which in turn results in single phase emissions and complete combustion. The result is a decrease in fuel consumption of about 30% at full load, and an average decrease of about 50% overall.

Complete valve seating results in a drastic increase in compression, the complete mixing of the fuel-air mixture, and the elimination of cold spots. This new invention ensures complete combustion, increases engine efficiency, reduces top combustion temperature, noise, knocking typical of diesel engines, NOx formation, sulfuric acid formation, and eliminates the risk of explosions involving methane, both inside and outside the engine. Instead of expelling pollutants into the atmosphere, the major product is supercritical water as a gas plasma, breathable oxygen and nitrogen, a monolithic gray translucent, reflective film that becomes deposited on the exhaust conduit, within the bed of silica and/or alumina, and other engine parts. This gray reflective film is believed to result from the aforementioned interactions between supercritical water as gas plasma and from the combustion products generated by the diesel engine. This gray film might itself be catalytically reactive, as it was more than once observed that no soot was generated initially after start-up, even after the diesel engine was disconnected from the catalytic bed of silica, but only after operating the engine for about a half and hour on a dynamometer at full load. The engine then resumed smoking as before.

Tests showed that the catalytic system according to the invention eliminated hydrocarbons and methane when operating a diesel engine in a methane rich environment, and eliminated methane and $CO_2$ by 80% or better, and eliminated CO, NOx, acetaldehyde, formaldehyde and sulfur, with no formation of sulfuric acid. The reduction in NOx and sulfuric acid is believed to result from the elimination of what is understood to be the second combustion phase in which sulfates interact with moisture to form sulfuric acid and nitrogen interacts with oxygen to form NOx at high temperature at a second and third phase of emissions (i.e. 850° C. caused by friction at valve seat).

In an exemplary embodiment, the highly reactive combustion atmosphere is generated from hydroxyl radicals formed initially by the interaction of an exhaust stream generated during operation of a diesel engine, including moisture, carbon dioxide, oxygen, and possibly other gaseous or fine particulate materials, with a bed of catalytically reactive silica, hydroxylbastnasite and/or alumina particles. The bed of silica is housed in a sealed box, requiring no maintenance. It simply provides for the distribution of the exhaust gases through a conduit and to bring the OH radicals ions to the location of the reaction, namely the combustion chamber.

The hydroxyl radicals, oxidizing ions, or other reactive species, through mechanisms not entirely understood, are believed to travel rapidly in all directions, including some to the combustion at the cylinders, reacting with carbons at the cylinders, and causing the fuel to burn more cleanly in the first instance, thereby eliminating substantially all pollutants that would otherwise be found. In addition, hydroxyl radicals interact with methane contained in the intake feed stream in the cylinder in order to prevent explosions and damage. The more efficient combustion in the cylinders initiated by the hydroxyl radicals greatly decreases the amount of fuel that is used and also causes the diesel engine to run much more coolly. Greatly reduced engine knocking was heard, which indicates elimination of premature combustion within the cylinders that is otherwise caused by red hot elemental carbon during compression stroke but before reaching full compression. No knocking was experienced even when up to 12% methane gas fed deliberately into the intake, a truly surprising and unexpected result that demonstrates that hydroxyls, supercritical water, and/or some other highly reactive species are at work improving the efficiency and reducing the operating temperature of the diesel engine.

As pressure is increased to bring the temperature to a point prior to 500° C., fuel is injected, and the combustion atmosphere according to the new invention causes complete combustion with the formation of supercritical water as a gas plasma. This was proved during testing at MSHA when five-minute soot filters showed a weight gain of only 3 mg that were found by MSHA scientist to not have single particle of soot and also to be translucent. Other gaseous or fine particulate materials are completely eliminated at top of piston during complete combustion.

Experimental tests showed that the emissions tested at the exhaust manifold, at low speed on a dynamometer, were $O_2$ 18.19%, $N_2$ 78.97%, $CO_2$ 1.88%, and at full load were $O_2$ 7.59, $N_2$ 83.18% and $CO_2$ 8.24%, with the balance comprising isomers and supercritical water as a gas plasma. The tested emissions surpass and are superior to any hydrogen future dream engine. Reasons as to the mechanics and movement of hydroxyl radicals is unknown. Their beneficial effect can be measured, the production is visible. Reactions of hydroxyl radicals in supercritical water as a gas plasma is easily recognized because elimination of all sulfur.

Exemplary systems include a diesel engine with an air intake and an exhaust, a reaction chamber that includes silica and/or alumina particles for generating the highly reactive combustion atmosphere, and optionally a methane-rich air environment. Methane-rich air is introduced into the engine through the air intake. Exhaust gases are fed from the exhaust into the reaction chamber comprising silica, hydroxylbastnasite and/or alumina particles, which generates the hydroxyl radicals responsible for forming the aforementioned degrading atmosphere. The reaction chamber is heated and/or maintained within a temperature range of about 30° C. to about 600° C. during catalytic degradation or processing of the exhaust stream produced by the diesel engine, preferably in a range of about 50° C. to about 500° C., more preferably in a range of about 75° C. to about 450° C., and most preferably in a range of about 100° C. to about 400° C.

It was heretofore unknown that hydroxyl radicals, found on the surface of the silica in a dehydrated state, are attracted to heat and carbon where they become hydrated. They create reactive cycles of hydrating and dehydrating in an atmosphere of heat and carbon in the combustion chambers. It is believed that moisture present in the exhaust stream creates a surface phenomenon on the silica and alumina particles that allows for the formation of hydroxyl radicals, oxidizing ions or other reactive species, which result in the formation of supercritical water as gas plasma in the combustion chambers. Although not directed to methods and systems for operating a diesel engine in a methane-rich environment, U.S. application Ser. No. 10/218,377, filed Aug. 13, 2002, discloses methods and systems that have more recently been found to be useful in protecting a diesel engine and/or persons located within a mine or other methane-rich environment. For purposes of disclosing exemplary methods and systems, the disclosure of the foregoing application is incorporated herein by reference.

The methods and systems of the present invention effectively and inexpensively eliminate, or at least substantially reduce, the quantity of unburned or partially burned combustion products produced by diesel engines operating in or near mines and other methane-rich environments. In so doing, the present invention protects people working in methane-rich environments from the hazardous pollutants that are generated in diesel engines. Furthermore, the methods of the present invention improve the emissions of certain machinery to comply with government regulations for operating machinery in methane-rich environments such as mines. In addition, the systems and methods of the present invention reduce the risk of explosions near and within the diesel engine. Tests performed by the inventor suggest that the methods of the present invention reduce the risk that the high methane concentration will cause the engine to explode due to the more explosive nature of methane.

Another important result of the elimination of soot according to the invention is that it reduces the temperature at the top of combustion (which is typically well over 850° C.) at the valve seat resulting from friction. This temperature drop is the result of eliminating soot that would otherwise cause friction, incomplete compression and fuel-air blow-by. Thus, even if methane were present in significant quantities in the fuel-air mixture, it would become fully mixed with the fuel and air with no cold spots. It is also believed that supercritical water (i.e., about 30%) as a gas plasma within the cylinders causes a reduction in the temperature by at least about 30%. A monolithic gray ultra thin translucent film is deposited, we believe, by supercritical water as a gas plasma at air intake manifold with hydroxyl radicals present, a coating that has been tested to be silicon nitride and resisted 50% HF.

These and other advantages and features of the present invention will become more fully apparent from the following description and appended claims.

BRIEF DESCRIPTION OF THE DRAWING

To further clarify the above and other advantages and features of the present invention, a more particular description of the invention will be rendered by reference to specific embodiments thereof which are illustrated in the appended drawing. It is appreciated that these drawing depicts only typical embodiments of the invention and is therefore not to be considered limiting of its scope. The invention will be described and explained with additional specificity and detail through the use of the accompanying drawing in which.

DETAILED DESCRIPTION OF EXEMPLARY EMBODIMENTS

The present invention relates to methods for greatly improving the operating efficiency of 2-cycle and 4-cycle diesel engines, particularly in a methane-rich environment. In an exemplary embodiment, the exhaust stream is introduced into a bed of silica, alumina or a mixture of silica and alumina. Through mechanisms which are not entirely understood it has been found that this bed of silica and/or alumina particles, without any special catalysts added thereto, is able to generate a highly reactive atmosphere that is able to eliminate methane, other hydrocarbons, carbonaceous soot, and carbon monoxide that would otherwise be present in the exhaust. Elimination of soot prevents incomplete valve seating and fuel blow-by. When operated in a methane-rich environment, this new scientific process is able to reduce the risks of unwanted external and internal engine explosions.

The terms "eliminate" or "elimination", as used in the specification and the appended claims, refer to the breakdown of larger organic molecules into smaller organic molecules, presumably through the catalytic cleavage of carbon-carbon bonds. These terms shall also refer to the cleavage of any other molecular bonds during the process of gasifying and oxidizing. The terms also include the complete oxidation of organic gases or particulates into carbon dioxide, water, and/or other oxidation products. It also includes any reaction in which CO, $CO_2$, carbon or hydrocarbons (including ambient methane gas) are converted into other, less polluting substances.

The terms "clean" and "cleaning" may be synonymous with the terms "eliminate" and "eliminating" but shall also include any process by which a more polluting substance is converted into a less polluting product. Thus, "clean" and "cleaning" shall refer to the elimination of, as well as any measurable reduction in, unburnt hydrocarbons (including methane gas), particulate carbon, soot, oil substances, and the like, as well as any conversion of gases such as CO, $CO_2$, NOx and $SO_2$ into less polluting substances. While $CO_2$ is not a "pollutant" in the same manner as CO, NOx, $SO_2$ and incomplete combustion products of carbon-containing fuels, it is believed to be a green house gas that may contribute to global warming. Thus, any reduction in the concentration of $CO_2$ in an exhaust stream, whether or not oxygen is produced, shall constitute "cleaning".

The terms "highly reactive environment" and "reactive combustion environment" shall refer to the condition within the reaction chamber, and surrounding areas, conduits, and engine cylinders in communication with the reaction chamber that include high enough concentrations of highly reactive hydroxyl radicals, supercritical water as a gas plasma and/or other reactive molecular fragments, free radicals, or species capable of degrading and cleaning a waste exhaust stream generated by the burning of a carbon-containing fuel.

The terms "activate" and "activated" shall refer to a condition in which silica and/or alumina particles are able to produce a "degrading atmosphere" capable of degrading and cleaning a waste exhaust stream generated by the burning of a carbon-containing fuel. "Activation" of silica has been shown to occur at various temperatures below about 600° C., and as low as 30° C., in the presence of waste exhaust gases produced by the combustion of diesel fuel in an internal combustion engine. In one instance the highest temperature reached 1125° C.

The term "incomplete combustion products", as used in the specification and the appended claims, shall refer to incompletely oxidized reaction products that are formed during combustion or other rapid or incomplete oxidation processes involving carbon-containing fuels, including diesel fuel. The incomplete combustion products may consist of, for example, gases, solid particulates, liquids, or mixtures thereof. Incomplete combustion products typically include carbon soot, unburned hydrocarbons, whether in particulate or in vaporous form, methane gas, carbon monoxide, hydrogen gas, and the like. The term "carbon soot" is a subset of the term "incomplete combustion products" and includes unburned and residual carbonaceous and hydrocarbon particulates.

The term "carbon-containing fuel" shall be understood to refer to any organic material that may be combusted or burned in order to generate or release energy, usually in the form of heat, light or a combination thereof. The term "fossil fuel" is a subset of "carbon-containing fuel" and includes coal, oil, natural gas, derivatives of coal, natural gas and oil, and the like.

The term "operating temperature" shall refer to any temperature at which hydroxyl radicals and/or other free radicals, molecular fragments or reactive species capable of cleaning an exhaust stream generated by the combustion of a carbon-containing fuel are generated by silica and/or alumina. It is presently believed that the operating temperature may range from as low as about 30° C. to as high as perhaps about 1125° C., although higher temperatures are not precluded to the extent they may be found to generate the necessary reactive combustion atmosphere.

The term "converter" shall be broadly construed to include any apparatus capable of holding therein silica and/or alumina and that provides appropriate conditions that result in the formation of the reactive combustion atmosphere of hydroxyl radicals and/or other reactive fragments or species.

The terms "interact" and "interacting," in the context of the formation of hydroxyl radicals through the interaction of moisture and silica or alumina, shall include any chemical reaction, including surface reactions between water vapor and silica or alumina, by which hydroxyl radicals are generated within the operating temperature.

The terms "interact", "interacting" and "interaction", in the context of the cleaning of waste exhaust gases by means of hydroxyl radicals, shall include any chemical reaction by which polluting components such as soot, hydrocarbons, CO, and oily substances are at least partially broken down or eliminated to yield a waste exhaust stream containing less pollution. It shall also refer to chemical reactions that involve the elimination or transformation of carbon dioxide into other carbon-containing compounds or substances, as well as the conversion of nitrogen oxides or other pollutants into less polluting substances.

Figure 1:
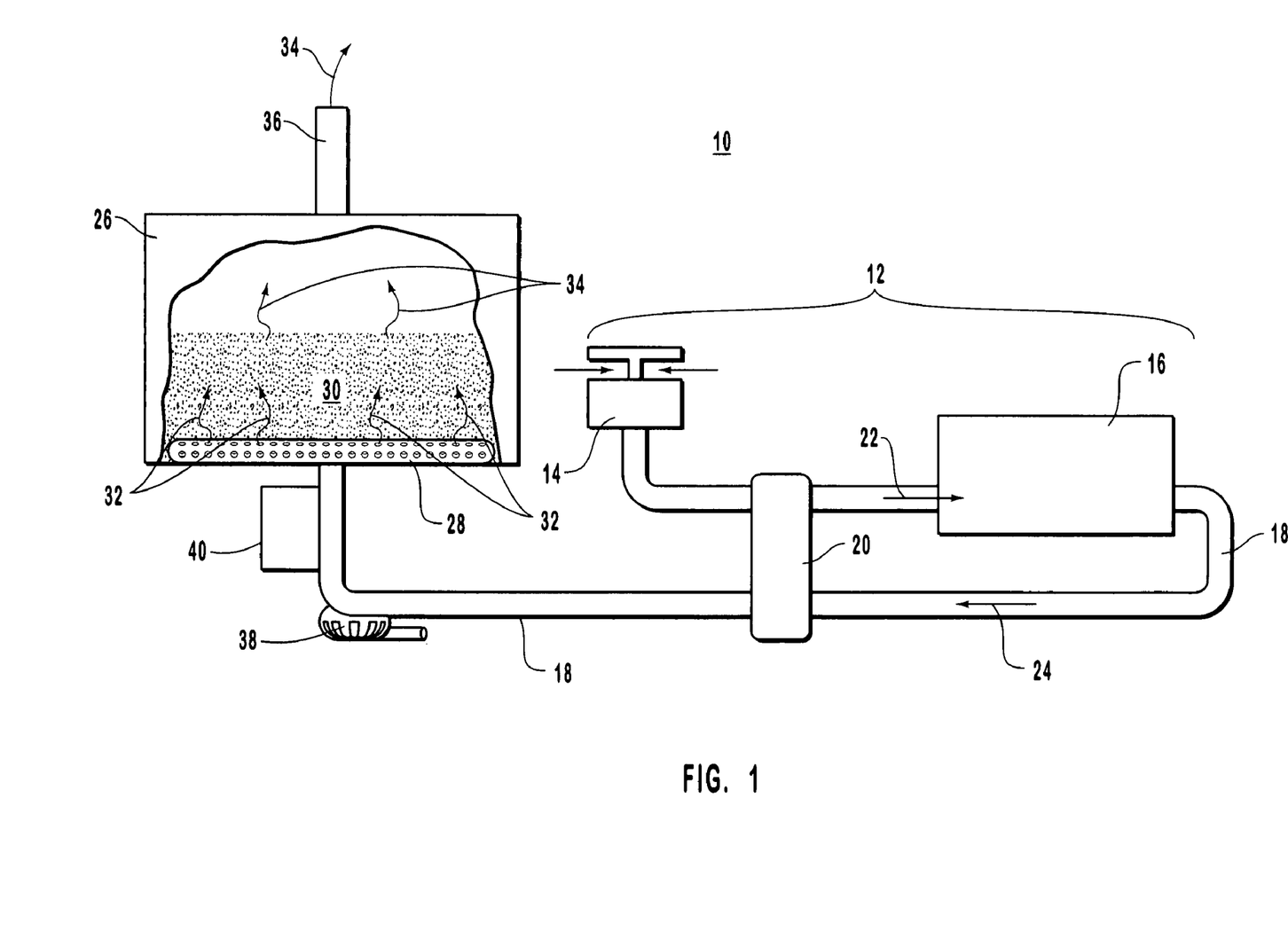
FIG. 1 is a cross-section view of an exemplary cleaning system of the present invention including the combination of a diesel engine and a reaction chamber comprising a bed of silica.

Reference is now made to FIG. 1, which illustrates an embodiment of a cleaning system 10 adapted for use in eliminating or reducing pollutants normally produced and expelled by a diesel engine, particularly when operated in a methane-rich environment. The diesel engine 12 can be a 2-cycle or a 4-cycle engine. Cleaning system 10 functions to clean or otherwise eliminate or reduce incomplete combustion products normally produced by a diesel engine. The process may be remedial and/or preventative. If remedial, the process may in some ways be similar to those provided by conventional catalytic converters, but without the need for expensive metallic catalysts, such as palladium, platinum and the like. If preventative, the process acts more like a combustion efficiency booster that eliminates or reduces formation of pollutants.

A typical diesel engine 12 comprises an air intake 14, a combustion chamber 16, and an exhaust channel 18. Air intake 14 can include a flame arrester for preventing external explosions from entering the combustion chamber via the air intake. The combustion chamber 16 can be a 2-cycle, or alternatively, a 4-cycle system. In a 2-cycle system, the combustion chamber is both purged of exhaust and filled with a fresh air-fuel mixture in a single stroke. Thus in a 2-cycle system, combustion occurs every down stroke. In a 4-cycle system, the exhaust is expelled, the combustion chamber is filled with a fuel-air mixture, the fuel-air mixture is compressed, and the fuel/air mixture is combusted every other up stroke of the piston.

A turbocharger 20 is configured to compress the air introduced into combustion chamber 16. Compressing the fuel-air mixture 22 increase the efficiency of the diesel engine 12 because it gives the engine 12 more horsepower without significantly increasing the weight of the engine. Turbocharger 20 also significantly benefits 2-cycle engines because it can perform the function of introducing fresh air without the need for the piston to draw the air into the chamber. Turbocharger 20 is often configured to communicate with the exhaust channel 18, such that the flow of exhaust gases, including unburned blow-by, can provide a force for driving the turbocharger.

Emissions 24 are discharged from the combustion chamber 16 into the exhaust channel 18. In FIG. 1, the exhaust channel 18 is depicted as providing an uninterrupted conduit that directs the emissions 24 into a converter 26. However, any appropriate means for introducing the emissions 24 into the converter 26 may be employed. The majority of emissions 24, in the case where the converter 26 of the present invention is not employed, typically consist of inert nitrogen gas, carbon dioxide, moisture, and some oxygen gas. However, non-ideal fuel-air ratios, incomplete mixing, inefficiencies inherent during acceleration, or other reasons, can cause the diesel fuel to burn incompletely. As a result, incomplete combustion products, most notably carbon soot, unburned particulate and gaseous hydrocarbons, and carbon monoxide are produced in significant quantities by the diesel engine 12. Such incomplete combustion products are often visible, particularly during the acceleration phase of a diesel powered vehicle.

Problems with incomplete combustion products are particularly problematic in a methane-rich environment because methane is combustible and can disturb or alter the desired fuel to air ratios in the fuel-air mixture. The danger of explosions rises as the concentration of incomplete combustion products in the hot exhaust gases rises, especially since the hot gasses are mixed with the methane-rich environment upon expulsion from the diesel engine. White-hot deposits of carbon caused by soot formation, improper valve seating, and blow-by can cause methane in the air-fuel mixture to explode.

The emissions 24 are introduced into the converter 26 by means of one or more diffusion pipes 28. The diffusion pipe 28 includes a plurality of holes or passages distributed about pipe 28, which allows for a desired distribution pattern of the emissions 24 throughout the converter 26. The emissions 24 are more particularly diffused throughout catalytically reactive particles 30 located within the converter 26 as diffused gases 32. The catalytically reactive particles 30 consist essentially of silica, alumina, or mixtures thereof. The term "consist essentially of" should be understood to mean that the catalytically reactive particles mainly consist of silica, alumina or mixtures thereof, but they may include minor quantities of impurities such as metals and ash typically found in silica and/or alumina. The converter 26 utilizes the bed of silica and/or alumina particles as the "initiator" of the reactive combustion atmosphere, which is active at the point of combustion. It is believed that the beneficial reactions involving the elimination of pollutants occurs at the point of combustion and that the converter 26 becomes a mere conduit for the clean emissions from the engine.

Figure 2:
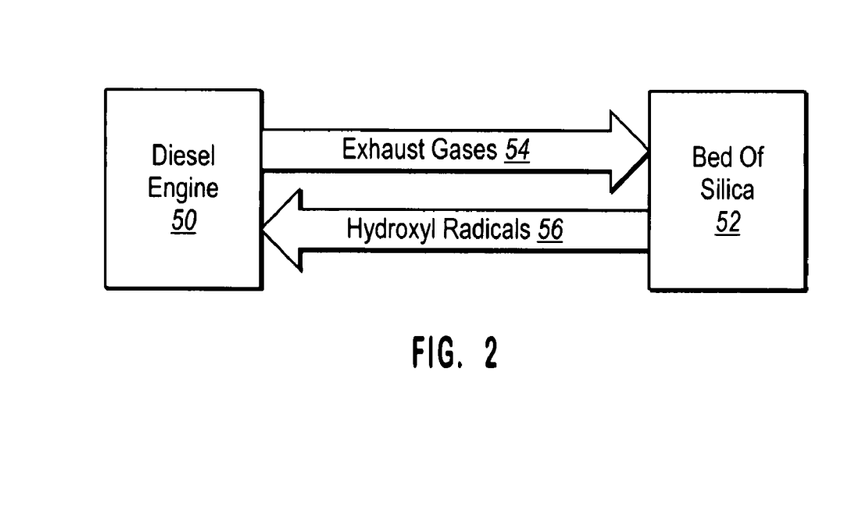
FIG. 2 is a box diagram that schematically illustrates the flow of exhaust and hydroxyl radicals between the diesel engine and the bed of silica.

FIG. 2 is a box diagram that schematically depicts the movement of exhaust gases and hydroxyl radicals between a diesel engine 50 and a bed 52 of catalytically reactive silica particles. More particularly, exhaust gases 54 produced by the diesel engine exits the exhaust manifold and is channeled to the bed of silica 52 by means of an exhaust conduit. Interaction between the exhaust gases 54 and the bed of silica 52 yields a highly reactive atmosphere comprising highly reactive hydroxyl radicals 56. The hydroxyl radicals 56 are highly energized and move in all directions, including back toward the diesel engine through the exhaust conduit and manifold, where they enter the cylinders. It is believed that the hydroxyl radicals 56 form supercritical water as a gas plasma within the cylinders, which greatly increases the efficiency of the engine, eliminates soot and fuel blow-by, and reduces the top combustion temperature. The result is single phase emissions and greatly reduced exhaust temperatures compared to convention diesel engines.

Figure 3:
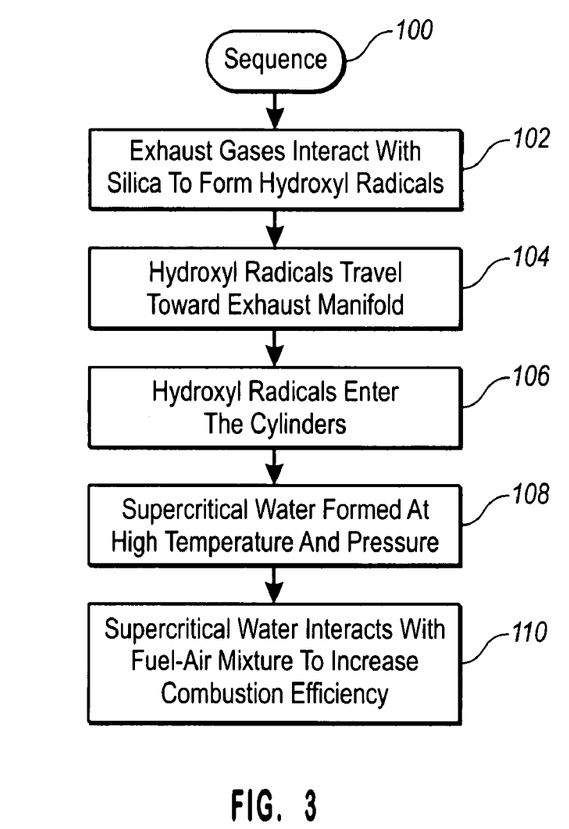
FIG. 3 is a flow chart showing the various steps involved in improving the combustion efficiency of a diesel engine according to the invention.

FIG. 3 is a flow diagram showing a sequence 100 including the various steps and reactions involved in the inventive diesel engine cleaning system according to the invention. In a first step 102, exhaust gases interact with silica and/or alumina to form hydroxyl radicals. In a second step 104, a portion of the hydroxyl radicals travel toward the exhaust manifold of the diesel engine. In a third step 106, the hydroxyl radicals enter the cylinders. In a fourth step 108, the hydroxyls form supercritical water at high temperature and pressure. In a fifth step 110, the supercritical water interacts with the fuel-air mixture in order to greatly increase combustion efficiency, eliminate soot and fuel blow-by, and reduce to combustion temperature.

It is believed that the silica and/or alumina, when properly activated in the presence of exhaust gases produced by the diesel engine, produce highly reactive hydroxyl radicals, and possibly other reactive species or molecular fragments, that are able to eliminate and clean a variety of pollutants found in a waste exhaust stream generated by the burning of carbon-containing fuels. Surprisingly, remediation of soot and oily substances within the exhaust valve ports and valve chamber of a 20-year old diesel engine has been observed, as well as the prevention of new soot or oily deposits. This observation suggests that perhaps the reactive atmosphere is somehow preventing the formation of soot and oily substances during combustion so that the effect is prophylactic or preventative instead of remedial. There is some evidence that may suggest that supercritical water may have some role in reducing or eliminating the formation of pollutants within the combustion chamber.

The reactions of the invention also reduce the temperature of the exhaust. Whereas typical specifications are for temperatures of about 500° C. at the muffler, exhaust temperatures emitted from the catalytic bed of silica were found to be as low as 30° C. (i.e., cool enough that moisture could be collected using a wax coated cup in one instance). In general, the exhaust gases exiting the converter, or catalytic chamber, are substantially less than 500° C., typically less than 200° C., often less than 100° C., and sometimes as low as 30° C.

Whereas the silica and/or alumina are believed to be responsible for the formation of the reactive atmosphere that includes abundant hydroxyl radicals such that expensive catalysts such as palladium and platinum are not necessary, inclusion of such materials would be within the scope of the present invention so long as the silica and/or alumina are "activated" and able to produce the reactive atmosphere. Nevertheless, all reactions, including all cleaning of emissions, appears to occur upstream at or near to the location of combustion.

In general, it is currently believed that the "operating temperature" (i.e., the temperature at which the catalytic particles are able to produce a reactive atmosphere of highly reactive hydroxyl radicals, supercritical water and/or other reactive species) may be as low as about 30° C. and as high as about 1125° C., preferably in a range of about 50° C. to about 500°

C., more preferably in a range of about 75° C. to about 450° C., and most preferably in a range of about 100° C. to about 400° C.

According to the method of the present invention, a diesel engine is operated in a methane-rich environment, or methane-rich air. The methane-rich air typically has a methane content of at least about 1%, more likely at least about 5%, even more likely at least about 8%, and most likely at least about 12%, by volume of the methane-rich air. High methane concentrations are known to occur in certain locations such as coal mines. Methane gas existing in the coal beads leaches into mine shafts and mixes with the air to create a methane-rich environment. The methane-rich environment can extend from the mine to the surrounding area such as near the entrance to the mine. Thus, locations near the mine can have elevated levels of methane. Methane-rich environments can be found in locations other than mines. For example, oil and gas exploration and recovery sites can create operating conditions with a methane-rich environment.

The methods of the present invention can be used with mining or other equipment that requires a diesel engine and is operated in a methane-rich environment. The methods of the present invention can be used with diesel powered coal mining machinery such as man transporters, roof bolters, mobile roof supports, degasification drills, loaders, dump trucks, and the like.

Various shapes and sizes of converter 26 can be designed to suit the particular size and shape of the diesel powered machinery to be used. Applicant's U.S. Pat. No. 6,235,247, which is incorporated herein by reference in its entirety, teaches modifying the shape and size of the converter to allow its use with a diesel powered truck. Some mining equipment, such as man transporters, are somewhat short and can benefit from a converter that is wider and shorter. Those skilled in the art will recognize that modifications to produce other sizes and shapes can be performed to accommodate various types of machinery used that may be used in methane-rich environments.

The systems and methods of the present invention reduce the risk of explosions within and near the diesel engine. The methods of the present invention reduce the risk of explosions near the exhaust because incomplete combustion products and methane are oxidized before they exist into the surrounding environment. This is chiefly the result of the reduction or elimination of incomplete valve seating and fuel-air blow-by, which, in turn, reduces the top combustion temperature.

For reasons not entirely understood, the methods of the present invention also decrease the likelihood that high methane concentration will cause the engine to explode due to the more explosive nature of methane. One theory is that hydroxyl radicals formed in the reaction chamber are able to travel upstream to the engine cylinders where they rapidly oxidize hydrocarbons, soot and other impurities, thus reducing the formation of particulates that can interfere with the seating of the valves. By reducing the interference by soot with proper valve seating, combustion pressures increase thereby increasing efficiency. In addition, the improved valve seating and efficiency of the diesel motor reduces the risk of the engine blowing up due to pre-ignition firing.

The methods of the present invention effectively and inexpensively eliminate, or at least substantially reduce, the quantity of unburned or partially burned combustion products produced by diesel engines operating in or near mines and other methane-rich environments. In so doing, the present invention protects people from the hazardous pollutants that are generated in a diesel engine. Furthermore, the methods of the present invention can improve the emissions of certain machinery to comply with government regulations for operating machinery in methane-rich environments such as mines.

EXAMPLE 1

A converter similar to the one depicted in FIG. 1 and which included silica as the catalytically reactive media was adapted for use with a diesel engine. The diesel engine that was utilized for this experiment was a 2-cycle bus engine. The converter was connected to the engine's exhaust and methane-rich air was introduced into the engine through the engine's air intake. The methane-rich air ranged in concentration from 1% to 15% by volume. The experiment was performed by setting the methane concentration to 1% and running the diesel engine for 40 seconds. The methane concentration was increased incrementally to 15% by volume with a 40 second test run for each incremental step.

The exhaust gases where introduced into the converter via a conduit that led into the underside of the converter at a temperature in a range from about 200° C. to about 375° C. In addition, a series of tubes configured and arranged so as to sample untreated exhaust gases as well as treated exhaust gases were interfaced with various analytical devices in order to test the level of waste products in the exhaust gases.

To establish a benchmark for the amount of catalytic oxidation being carried out, samples of untreated gas and treated gas were taken at varying intervals as methane concentration was increased from 1% to 15%. A noticeable reduction in incomplete combustion products was observed in the exhaust stream.

The results of this experiment showed a noticeable drop in the level of carbon soot, carbon monoxide and nitrogen oxides. This demonstrated that the silica particles were catalytically reactive since merely passing a stream of exhaust gases through an inert bed would not be expected to cause further oxidation of any incomplete combustion products found therein. The dramatic increase in the rate and extent of oxidation of the incomplete combustion products strongly indicates the catalytic capabilities of the converter relative to waste exhaust gases.

Furthermore, the converter appears to have effectively protected the diesel engine from internal explosion. Typically a methane concentration in the air intake that is in excess of 15% by volume can cause an engine to pre-ignite or explode. The operation of the present invention under such conditions without an explosion or knocking suggests the effectiveness of the invention at preventing internal explosions.

In conclusion, the present invention provides methods and systems that can effectively and inexpensively eliminate, or at least substantially reduce, the quantity of unburned or partially burned combustion products produced by diesel engines in a methane-rich environment. Methods of the present invention unexpectedly reduce the internal and external explosion tendency of burning carbon-containing fuels in a diesel engine in a methane-rich environment. Furthermore, the methods of the present invention control the pollution emission levels of the diesel engine operating in a methane-rich environment to within standards acceptable for operating diesel engines in mines and other high methane-rich environments.

EXAMPLE 2

A 1981 Freightliner truck housing a Caterpillar 3406A 380 hp. diesel engine with over 890,000 miles on it was tested. During the test, three sets of OEM piston rings wore out, spewing out five gallons of oil from the crankcase into the cylinders. The engine kept running, although there was a drop in power to 250 hp. There was no blow-by and no valve clatter. When the engine was disassambled, the No. 3 ring was completely worn and two others were passing oil. The crankcase oil was analyzed and showed no contamination. There was no damage to any moving parts. No soot or oil was found in the exhaust, indicating that the catalytic converter comprising the bed of silica was actively producing hydroxyl radicals, which cleaned 5 gallons of crankcase oil as if it were actual fuel.

The exhaust temperature, at 100% load, dropped by 31% from normal operating temperatures without the converter, at the same load factor. This repeats each time a 100% load is reached. Fuel efficiency increased by 30% at full load.

Thereafter, the exhaust system was dismantled for examination. A mechanic from Caterpillar, which witnessed the event, had difficulty believing that after 890,000 miles the turbo was in original and pristine condition because they appeared so clean. The mechanics removed the turbocharger to inspect the turbo's blades. They were completely devoid of any soot residue. This was further proof that the hydroxyl radicals eliminated soot upstream from the bed of silica. Later it was discovered that they actually reach the point of combustion. The mechanics who did the dismantling reported that all parts were original equipment, that there was no indication that this engine had ever been overhauled or rebuilt.

EXAMPLE 3

Any of the apparatus shown or described in U.S. application Ser. No. 10/218,377, filed Aug. 13, 2002, previously incorporated herein by reference, is modified by placing it within a methane-rich environment, such as a mine, particularly a coal mine, in order to yield an apparatus that is more safely operated within the methane-rich environment compared to apparatus devoid of the catalytic systems according to the invention.

The present invention can be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A method for safely operating a diesel engine in a methane-rich environment, comprising:
    operating a diesel engine in a methane-rich environment, comprising at least 1% by volume methane;
    generating exhaust gases by said diesel engine;
    step for generating a highly reactive atmosphere comprising at least one of hydroxyl radicals or supercritical water; and
    step for preventing at least one of damage to the diesel engine by the methane-rich air or explosion of the methane-rich air during operation of the diesel engine.

2. A system for safely operating a diesel engine in a methane-rich environment comprising means for carrying out the method of claim 1.

3. A method for safely operating a diesel engine in a methane-rich environment, comprising:
    providing a diesel engine having an air intake and an exhaust, the diesel engine being configured to power a piece of mining equipment;
    introducing methane-rich air from a mine containing greater than about 1% by volume methane into the diesel engine through the air intake and mixing the air mixture with diesel fuel to produce an air-fuel mixture;
    combusting the air-fuel mixture by the diesel engine to form an exhaust product;
    providing a bed of silica or alumina particles; and
    introducing the exhaust product produced by the diesel engine into the bed in order for the particles to contact or come into close proximity to the exhaust product in order to yield hydroxyl radicals that act to catalytically eliminate at least a portion of the methane.

4. A system for safely operating a diesel engine in a methane-rich environment comprising means for carrying out the method of claim 3.

5. A method for operating a diesel engine having single phase emissions and substantially complete combustion, comprising:
    (a) operating a diesel engine to produce an exhaust stream;
    (b) forming hydroxyl radicals by inputting the exhaust stream into a catalytic chamber containing a bed of particles which consist essentially of at least one of silica, hydroxylbastnasite or alumina particles by means of an exhaust channel;
    (c) channeling the hydroxyl radicals back to the diesel engine through the exhaust channel;
    (d) forming supercritical water as a gas plasma from the hydroxyl radicals within cylinders of the diesel engine; and
    (e) interacting the supercritical water formed within the cylinders with fuel and air within the cylinders in order to enhance combustion efficiency of the diesel engine and substantially eliminate soot emission.

6. A method according to claim 5, wherein (e) results in complete valve seating, increased engine compression, and elimination of one or more of fuel blow by, clatter noise, carbon monoxide, formaldehyde, acetaldehyde, methane, up to 99.999% of sulfur, up to 99% of hydrocarbons, up to 80% of $CO_2$, NOx, or sparks from exhaust.

7. A method according to claim 5, wherein exhaust gases exiting the catalytic chamber have a temperature less than 200° C.

8. A system comprising means for carrying out the method of claim 5.

9. A method for safely operating a diesel engine in a methane gas-rich environment in order to reduce methane-initiated explosions, comprising:
    providing a diesel engine having an air intake and an exhaust;
    introducing methane-rich air containing greater than about 1% by volume methane into the diesel engine through the air intake and mixing the methane gas-rich air with diesel fuel to produce an air-fuel mixture;
    combusting the air-fuel mixture by the diesel engine to form exhaust gases;
    generating a reactive atmosphere at the point of combustion by interacting said exhaust gases with at least one of silica, hydroxylbastnasite or alumina; and
    causing or allowing at least a portion of said reactive atmosphere to migrate at or near where said combusting occurs in order to substantially eliminate soot deposition on engine valve seats, thereby allowing engine valves to seat completely and prevent at least one of damage to the diesel engine by the methane-rich air in the air-fuel mixture or explosion of methane within the methane-rich air during operation of the diesel engine.

10. A method according to claim 9, wherein the diesel engine is a 2-cycle diesel engine.

11. A method according to claim 9, wherein the diesel engine is a 4-cycle diesel engine.

12. A method according to claim 9, wherein the methane gas-rich contains at least 5% by volume methane.

13. A method according to claim 9, wherein the methane gas-rich air contains at least 8% by volume methane.

14. A method according to claim 9, wherein the methane gas-rich air contains at least 12% by volume methane.

15. A method according to claim 9, wherein the methane gas-rich air is produced by a coal bed.

16. A method according to claim 9, wherein the reactive atmosphere comprises at least one of hydroxyl radicals or supercritical water.

17. A system for safely operating a diesel engine in a methane-rich environment comprising means for carrying out the method of claim 9.

18. A method according to claim 9, wherein substantially eliminating soot deposition on the valve seats substantially prevents air-fuel blow-by during combustion of the diesel engine.

19. A method according to claim 18, wherein substantially eliminating soot deposition on the valve seats and substantially preventing air-fuel blow-by yields single-phase combustion of the diesel engine.

20. A method according to claim 9, wherein the reactive atmosphere is formed by passing the exhaust gases through a bed of said silica or alumina particles maintained at an operating temperature in a range of about 30° C. to about 600° C.

21. A method according to claim 20, wherein the bed is maintained at an operating temperature in a range of about 50° C. to about 500° C.

22. A method according to claim 20, wherein the bed is maintained at an operating temperature in a range of about 75° C. to about 450° C.

23. A method according to claim 20, wherein the bed is maintained at an operating temperature in a range of about 100° C. to about 400° C.

* * * * *

UNITED STATES PATENT AND TRADEMARK OFFICE
CERTIFICATE OF CORRECTION

PATENT NO. : 7,509,798 B2
APPLICATION NO. : 10/974094
DATED : March 31, 2009
INVENTOR(S) : Thomas C. Maganas It is certified that error appears in the above-identified patent and that said Letters Patent is hereby corrected as shown below:

Title Page
Line 11, ABSTRACT, change "increases" to --increase--

Column 1
Line 18, before "particularly" insert --a--

Column 3
Line 3, change "seat, at" to --seat, and at--

Column 4
Line 54, remove "ions"

Column 5
Line 17, change "scientist" to --scientists--
Line 17, change "have single" to --have a single--
Line 19, change "of piston" to --of the piston--
Line 24, change "7.59" to --7.59%--
Line 29, change "measured, the" to --measured, and the--

Column 6
Line 30, change "at air" to --at the air--
Line 43, change both instances of "drawing" to --drawings--
Line 43, change "depicts" to --depict--
Line 44, change "is" to --are--
Line 47, change "drawing" to --drawings--

Column 9
Line 62, insert --34-- after "emissions"
Line 67, change "exits" to --exit--
Line 67, change "is" to --are--

Column 10
Line 12-13, change "convention" to --conventional--

UNITED STATES PATENT AND TRADEMARK OFFICE
CERTIFICATE OF CORRECTION

PATENT NO. : 7,509,798 B2
APPLICATION NO. : 10/974094
DATED : March 31, 2009
INVENTOR(S) : Thomas C. Maganas It is certified that error appears in the above-identified patent and that said Letters Patent is hereby corrected as shown below:

Column 11
Line 11, change "beads" to --beds--
Line 43, change "exist" to --exit--

Column 12
Line 19, change "where" to --were--

Column 13
Line 26, change "equipment, that" to --equipment and that--

Signed and Sealed this

Sixth Day of October, 2009

David J. Kappos
*Director of the United States Patent and Trademark Office*